(12) United States Patent
Marsh

(10) Patent No.: US 7,169,009 B2
(45) Date of Patent: Jan. 30, 2007

(54) GAME CALL STRIKER

(76) Inventor: Robert E. Marsh, 4144 Pennsylvania Ave., Kansas City, MO (US) 64111

( * ) Notice: Subject to any disclaimer, the term of this patent is extended or adjusted under 35 U.S.C. 154(b) by 49 days.

(21) Appl. No.: 11/044,306

(22) Filed: Jan. 27, 2005

(65) Prior Publication Data

US 2005/0170741 A1 Aug. 4, 2005

Related U.S. Application Data

(60) Provisional application No. 60/541,880, filed on Feb. 4, 2004.

(51) Int. Cl.
*A63H 5/00* (2006.01)
(52) U.S. Cl. .................. 446/397; 446/402; 84/403
(58) Field of Classification Search ............... 446/397, 446/418, 421, 402, 213; 84/402, 403, 404
See application file for complete search history.

(56) References Cited

U.S. PATENT DOCUMENTS

| | | | | |
|---|---|---|---|---|
| 1,269,511 A | * | 6/1918 | Roberge | 84/403 |
| 2,958,157 A | * | 11/1960 | Tannehill | 446/397 |
| 3,766,683 A | * | 10/1973 | Vennola | 446/126 |
| 3,837,115 A | * | 9/1974 | Vennola | 446/418 |
| 4,170,106 A | * | 10/1979 | Koslosky | 446/265 |
| 4,610,641 A | * | 9/1986 | Allen | 446/397 |
| 4,669,353 A | * | 6/1987 | Kvistad | 84/403 |
| 4,850,928 A | * | 7/1989 | Stewart | 446/397 |
| 4,904,221 A | * | 2/1990 | Taylor | 446/397 |
| 4,988,325 A | * | 1/1991 | Alderson et al. | 446/397 |
| 5,928,056 A | * | 7/1999 | Molotschko | 446/418 |
| 6,149,492 A | * | 11/2000 | Davis, Jr. | 446/397 |
| 6,512,169 B1 | * | 1/2003 | Santini | 84/402 |
| 6,669,529 B1 | * | 12/2003 | Scaries | 446/397 |

* cited by examiner

*Primary Examiner*—Kien Nguyen

(57) ABSTRACT

This invention is a striker for a friction game call that comprises two or more separate pegs. When the pegs are moved against a slate or other plate surface, a multiple-pitched call sound is made.

11 Claims, 3 Drawing Sheets

GAME CALL STRIKER

CROSS-REFERENCE TO RELATED APPLICATIONS

This application claims the benefit of U.S. Provisional Patent Application No. 60/541,880, filed Feb. 4, 2004.

STATEMENT REGARDING FEDERALLY SPONSORED RESEARCH OR DEVELOPMENT

Not Applicable.

BACKGROUND OF THE INVENTION

This invention is an improved striker for a friction game call, such as a friction turkey call. The typical friction turkey call striker comprises a single peg. The peg may be relatively long (4 to 8 inches, as in U.S. Pat. No. 4,988,325 or U.S. Pat. No. 4,904,221) or relatively short (as in U.S. Pat. No. 2,958,157). Striker pegs are traditionally made of wood, but may also be made of graphite, plastic or other suitable materials. The peg is moved across a plate, which is traditionally flat and made of slate, but may also be made of fiberglass, aluminum, plastic, or other suitable materials. The sound made by the call as the peg is moved across the plate will vary based on the material and dimensions of the pegs (as well as the material of the plate), and other factors. The friction of the striker peg against the plate creates the call sound. This type of game call is sometimes called a "slate" call since slate was one of the original materials used for the plate of this call. The peg used with a slate call has traditionally been called a "striker." While this invention is primarily related to an improvement in the traditional striker, the multiple peg feature of this invention can be used in any friction call application, and the term "striker" is to be interpreted broadly as any game call component that is moved against a plate to make a call sound.

The sound made by a typical slate turkey call is fairly realistic, but is a single tone. The actual sound made by a turkey is typically a simultaneous combination of different pitches and is more of a multiple pitch, or "chord," sound.

SUMMARY OF THE INVENTION

The present invention is an improved friction turkey call striker that comprises two (or more) separate pegs as part of a single striker assembly. Each peg creates a slightly different sound, thus creating a highly effective dual tone "chord". The sound difference between the pegs may be the result of differences in the dimensions of the pegs, differences in the angles at which each peg is held against the plate, differences in the friction characteristics of the end of each peg at the point of contact with the plate, or differences in the points at which the user's hand contacts each peg.

In an alternate embodiment, the invention constitutes a peg holding device that holds separate peg strikers of the user's choosing in the appropriate position to create the multiple pitched sound. Without such a holder, the importance of the correct angle between each striker peg and the plate would make it almost impossible to properly hold and use two strikers at the same time.

DETAILED DESCRIPTION OF THE INVENTION

Figure 1:
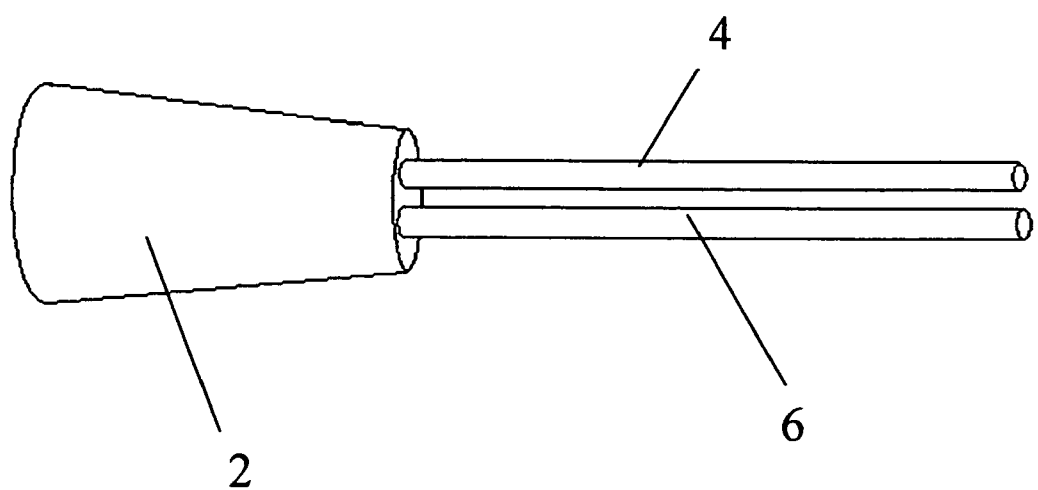
FIG. 1 shows a preferred embodiment of the invention.

FIG. 1 shows the preferred embodiment of the present invention. The striker includes a handle (2) and 2 pegs (4, 6). The handle and pegs may all be made of wood, although plastic and many other materials would also be suitable. Ideally the woods used for peg (4) and peg (6) are different so that each will have different sound characteristics. For example, in a preferred embodiment one peg is walnut and the other is oak. The pegs are preferably substantially cylindrical, are 3 inches to 6 inches in length, and are ⅛ inch to ⅜ inch in diameter.

Figure 2:
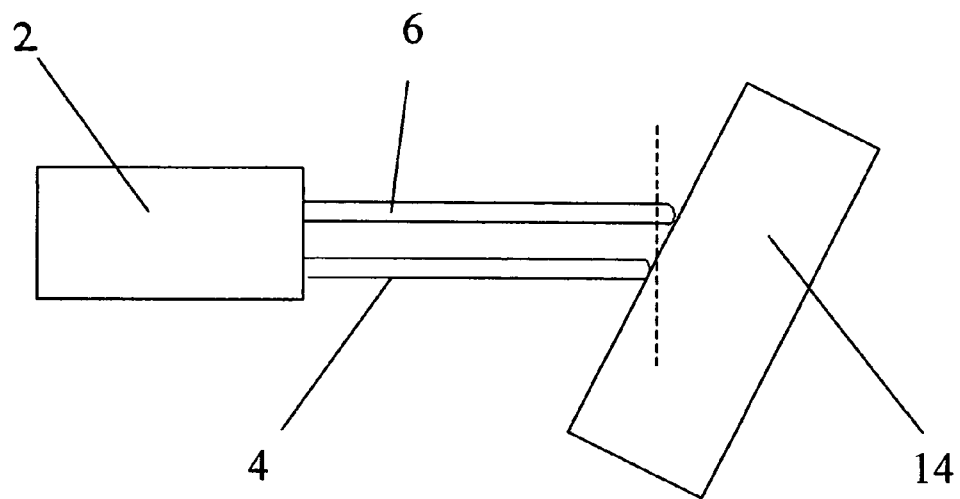
FIG. 2 shows the contact of the double pegs of the invention with a plate surface.

FIG. 2 shows an alternative embodiment of the invention with one peg (6) extending beyond the length of the other peg (4). The striker of this embodiment would be held by the user at an angle to the plate (14).

Figure 3:
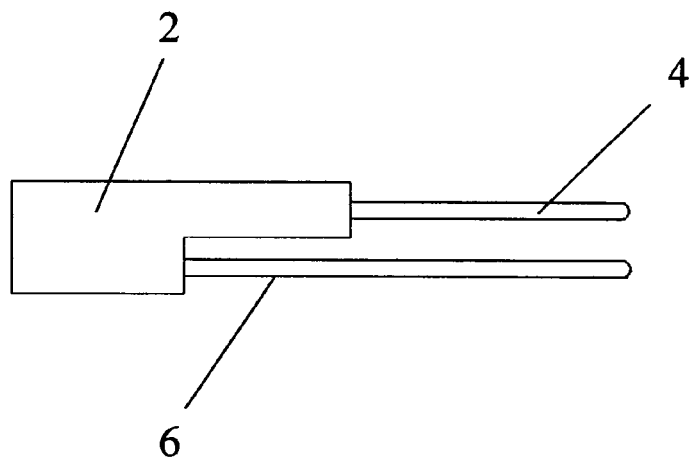
FIG. 3 shows an alternative embodiment of the invention with the pegs having different lengths.
Figure 4:
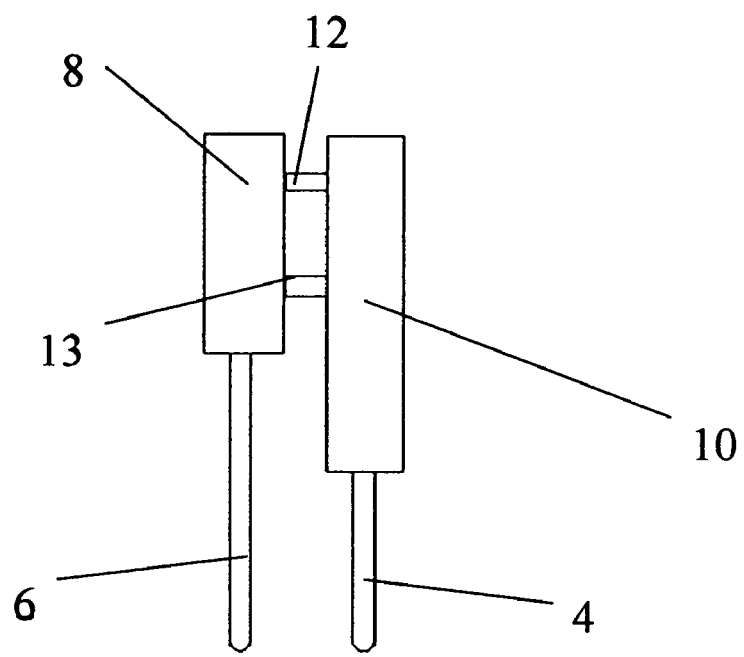
FIG. 4 shows an alternative embodiment of the invention with the handle comprised of separate components.

In the alternate embodiment in FIG. 3 pegs (4) and (6) have different lengths. In the embodiment shown in FIG. 4 the handle (2) is comprised of two components (8, 10) with a peg (4, 6) attached to each component. Handle components (8) and (10) are acoustically "isolated" from each other to some degree by use of spacers (12, 13). The spacers may be made of rubber or a material with similar properties. The degree of isolation may be varied with the spacer material and/or configuration.

A user grasps the pegs between his or her thumb, index, and middle fingers of one hand and the pegs are brought into contact with the plate. The pegs are held at an angle to the plate and moved in a circular motion across the plate. It is desirable to have the pegs slightly skewed such that the distance between them at the point of contact with the plate is greater than the distance between them at the point of attachment to the handle. In this configuration, slight pressure from the fingers of the user will easily move the somewhat flexible pegs into a parallel configuration, and changes in that pressure will permit further sound variation.

FIG. 2 shows the contact of the pegs (4, 6) of the present invention with the plate surface (14). The friction of the pegs on the plate create the call sound. Because of different materials used and/or different peg lengths, and because a user's hand and fingers would typically contact the pegs at different distances from the plate surface, the pegs make simultaneous, but differently pitched, sounds. Thus a realistic "chord-like" sound is made by the call.

In use each of the pegs should contact the plate with approximately the same pressure. While the striker functions properly if the pegs are of equal length, in some cases it is desirable to allow one peg to extend slightly beyond the other (see FIG. 2). Since different users may hold the striker assembly at different angles to the plate, it is also desirable to have one or more of the pegs adjustable so that the peg lengths can be varied as necessary.

Figure 5:
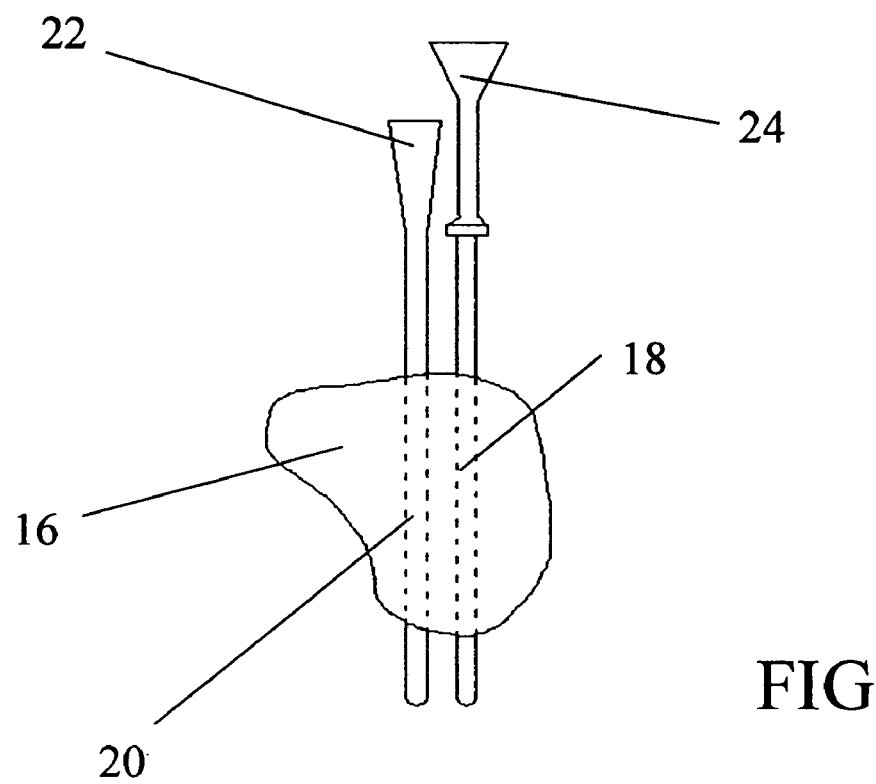
FIG. 5 shows an alternative embodiment of the invention.

FIG. 5 shows a holder (16) for multiple game call peg strikers (22, 24) comprising at least 2 peg receiving apertures (18, 20) that hold the pegs in the proper configuration for movement against the call plate. The holder is ideally made of a pliable material, such as rubber, which will permit insertion of pegs of varying diameters and will further permit movement of the pegs within the holder to permit proper alignment of the ends of the pegs. It is important that such peg alignment movement requires sufficient force so that the pegs will not inadvertently move during the calling process. In FIG. 5 the peg configuration is approximately parallel and the exterior surface structure of the holder is configured to correspond to the structure of the hand and fingers of a user when the striker assembly is held in proper alignment with the plate surface. Thus the holder not only keeps the pegs in proper alignment with each other, but also aids the user in holding both of the pegs in proper alignment with the plate.

I claim:

1. A game call striker comprising:
   two cylindrical pegs 3 to 6 inches in length, and ⅛ inch to ⅜ inch in diameter;
   a handle component to which the proximal end of each said peg is attached;
   said pegs configured to allow concurrent contact of said pegs' distal ends with a frictional surface;
   whereby the sound of wild game is replicated by the concurrent contact of said pegs' distal ends with a frictional surface.

2. The game call striker in claim 1 where each peg is attached to the same handle component.

3. The game call striker in claim 2 in which the pegs are parallel to each other.

4. The game call striker in claim 2 in which the pegs are slightly skewed such that the distance between their distal ends is greater than the distance between their proximal ends.

5. The game call striker in claim 2 in which the length of at least one of the pegs is adjustable.

6. The game call striker in claim 1 in which each peg is attached to a separate handle component and the handle components are attached to each other with a spacer material between them.

7. A game call striker comprising:
   a holder with at least 2 peg receiving apertures;
   each peg receiving apertures having a separate cylindrical peg 3 to 6 inches in length and ⅛ inch to ⅜ inch in diameter that is adjustably attached at the peg's proximal end to the receiving apertures to allow concurrent contact of each pegs' distal end with a frictional surface;
   whereby the sound of wild game is replicated by the concurrent contact of said peg's distal ends with a frictional surface.

8. The game call striker in claim 7 in which the separate pegs are in an approximately parallel configuration.

9. The game call striker in claim 7 in which the separate pegs are in a slightly skewed position such that the distance between the separate pegs at the distal ends, which will contact a call plate, are greater than the distance between the pegs at their proximal ends.

10. The game call striker in claim 7 wherein the holder is made of a pliable material so that the apertures will receive pegs of various diameters and so that the pegs may be forcibly moved within the apertures.

11. The game call striker in claim 7 in which the exterior surface structure of the holder is configured to correspond to the structure of the hand and fingers of a user when holding the pegs in proper alignment with a call plate surface.

* * * * *